UNITED STATES PATENT OFFICE.

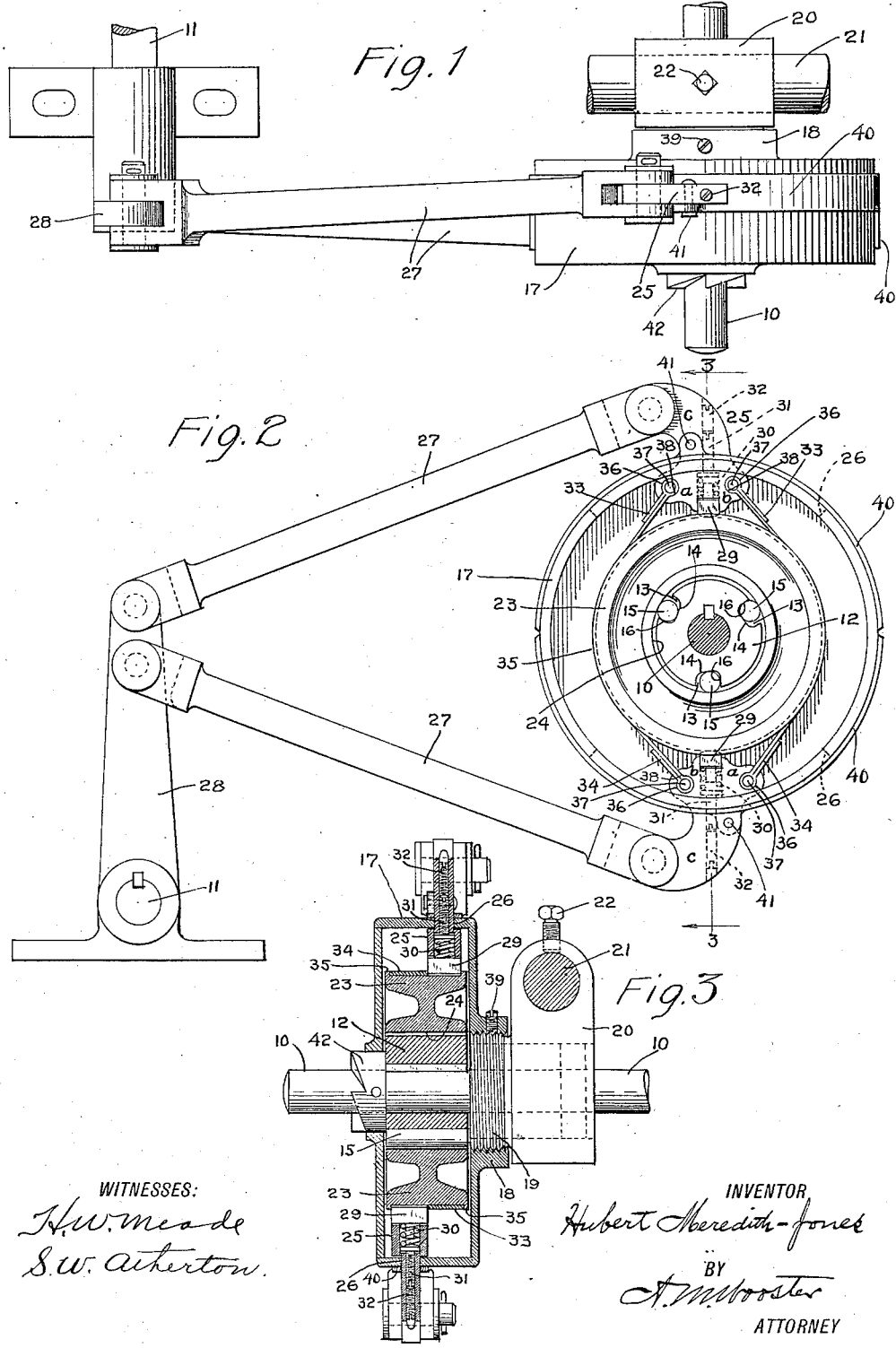

HUBERT MEREDITH-JONES, OF NEW YORK, N. Y., ASSIGNOR TO COLUMBIA NUT AND BOLT COMPANY, INCORPORATED, OF BRIDGEPORT, CONNECTICUT, A CORPORATION OF NEW YORK.

STARTING MECHANISM FOR EXPLOSIVE-ENGINES.

1,059,681.  Specification of Letters Patent.  Patented Apr. 22, 1913.

Application filed June 10, 1912. Serial No. 702,733.

*To all whom it may concern:*

Be it known that I, HUBERT MEREDITH-JONES, a subject of the King of England, residing at New York city, county of New York, State of New York, have invented an Improvement in Starting Mechanism for Explosive-Engines, of which the following is a specification.

This invention has for its object to provide a simple, inexpensive and efficient mechanism for converting reciprocating into rotary motion, adapted for general use and especially adapted for use as a starting device for explosive engines, as upon motor vehicles and aeroplanes.

An important feature of the invention is the releasing of the mechanism in case of a backfire, thus avoiding injury to the operator or to the mechanism.

With the above and other objects in view the invention consists in certain constructions and in certain parts, improvements and combinations which will be hereinafter described and then specifically pointed out in the claims hereunto appended.

In the accompanying drawing forming a part of this specification, in which like characters of reference indicate the same parts, Figure 1 is a plan view of my novel mechanism; Fig. 2 an elevation with the cover plate removed; and Fig. 3 is a section on the line 3—3 in Fig. 2.

10 denotes an engine shaft and 11 a starting shaft.

The engine shaft has rigidly secured thereto a driving disk 12 which is provided in its periphery with a plurality of recesses 13 deepest at one end and providing inclines 14, all of which extend in the same direction from the deep portions of the recesses.

15 denotes rollers in the recesses of greater diameter than the depth of the recesses, which normally lie against the rear walls of the recesses, specifically indicated by 16.

17 denotes a casing having an internally threaded flange 18 which engages a threaded hub 19 on a bearing 20 (preferably a ball bearing) which is adjustable on a fixed support 21 and is locked to position thereon by a set screw 22.

23 denotes a drum which lies within the casing and is provided with a central hole 24 which receives the driving disk and the rollers.

25 denotes three-armed rockers, the arms being specifically indicated by $a$, $b$ and $c$. Arms $a$ and $b$ lie wholly within the casing and arms $c$ extend outward through slots 26 in the casing.

27 denotes links pivoted to arms $c$ of the rockers and to a lever 28 which is rigidly secured to the starting shaft.

29 denotes bearing blocks which lie in slots in the rockers and engage the periphery of the drum. The bearing blocks preferably rest upon relatively strong springs 30 lying in sockets in the rockers. The tension of these springs may be regulated by adjusting screws 31 in the rockers provided with heads which bear against the springs.

32 denotes set screws for locking the adjusting screws against movement.

33 and 34 denote metallic gripping bands, the ends of which are attached to the arms $a$ and $b$ of the rockers respectively and which inclose the drum. The gripping bands lie side by side on the periphery of the drum and are retained in place thereon by edge flanges 35, the slots in the drum and the rockers being located to correspond in position with the respective gripping bands. The ends of the gripping bands are rigidly attached to the respective rockers, the attachment being made in any preferred manner. I have shown the ends of the bands as bent backward upon themselves to form eyes 36 in which pins 37 are placed, the eyes, pins and doubled ends of the bands being slid transversely into correspondingly shaped sockets 38. It will be noted that the arms $a$ of the rockers are appreciably longer than arms $b$ and that the bearing blocks are so located in the rockers that the distance from the bearing points of the rockers to the points of attachment of the gripping bands to arms $a$ is appreciably greater than from the bearing points to the points of attachment of the gripping bands to arms $b$, the purpose of which will presently be fully explained. The case is adjusted to secure proper alinement of the links, rockers and gripping bands by rotating it upon hub 19, after which it is locked at the required adjustment by a set screw 39 in hub 19. The grip of the bands upon the drum is determined by the adjustment of screws 31. Wear of the bands and disk may be compensated for in the same manner. Slots 26 in the casing are covered to prevent the entrance of dust or moisture by means of slides 40 curved to correspond with the periphery of the casing and pivotally attached to the rockers as at 41 so as to reciprocate with the rockers and effectually cover the slots.

The operation is as follows: The starting shaft may be oscillated in any convenient manner, as by a lever secured to the shaft and lying in convenient position to be operated from the seat of a motor vehicle. Operating means is not shown as specifically it forms no portion of the present invention. The oscillatory movement of lever 28 imparts reciprocatory movement to the rockers, one moving forward as the other moves backward. Suppose that the links are moving forward. The effect will be to tilt the rockers on the bearing blocks slightly toward the right, as seen in Fig. 2. The arm $a$ to which gripping band 33 is attached will be moved outward slightly from the engine shaft and the arm $a$ to which gripping band 34 is attached will be moved inward slightly, the corresponding arm $b$ of each rocker being of course moved in the opposite direction. As the amount the arm $b$ of either rocker can move is appreciably less than the corresponding arm $a$ can move in the opposite direction, it follows that the band attached to an outwardly moving arm $a$ will be tightened about the drum with sufficient friction to grip it tightly and cause forward movement thereof. As the arm $a$ of one rocker was moving inward while the other arm $a$ was moving outward it follows that while the drum was being gripped tightly and carried forward by one band the other band was loose and was sliding backward over the surface of the drum. The instant the movement of the links in either direction ceases, the movement in the reverse direction commences and the previously tight band is loosened and the previously loose band is tightened, which continues the forward rotation of the drum. The instant the rotation of the drum commences, the rollers are caused to travel up the inclines of recesses 13 and quickly wedge between the inclined wall of the recess and the peripheral wall of hole 24 in the drum, so that the driving disk and with it the engine shaft will be carried forward by the drum. It will be noted that the engine shaft is provided with a ratchet wheel 42 so that a crank may be applied and the engine started by "cranking up" in the usual way if desired.

Should the engine backfire, the engine shaft will carry the driving disk backward, and as the engine power is greater than the applied power, through the wedging action of the rollers, the drum will be carried in the reverse direction. The effect of this will be, through the frictional engagement of the drum with the operative gripping band, to tilt the operative rocker the slight amount necessary to relieve the tension previously exerted upon the gripping band and leave the drum released and the rockers and gripping band in a balanced position ready to be operated again from the starting point.

When the engine starts ahead as in normal running, the driving disk carried by the engine shaft will rotate at a greater speed than can be applied to the drum by the starting mechanism and the rollers will drop backward down the inclines and will lie in engagement with the rear walls of the recesses, thereby disconnecting the starting mechanism from the engine shaft and leaving the rollers in their recesses to act as roller bearings between the engine shaft and the starting mechanism.

Having thus described my invention I claim:

1. Starting mechanism comprising a disk having peripheral recesses with inclines, rollers in said recesses, a drum having a central hole which receives the disk and the rollers, rockers bearing upon the periphery of the drum, gripping bands which inclose the drum and are attached to the rockers at unequal distances from the bearing points and means for actuating the rockers to cause the bands to alternately grip and release the drum, whereby forward movement of the drum and disk is produced.

2. Starting mechanism comprising a disk, a drum having a central hole which receives the disk, connections between the disk and the drum, rockers provided with yielding bearing blocks which engage the periphery of the drum, gripping bands which inclose the drum and are attached to the rockers at unequal distances from the bearing points and means for actuating the rockers to cause the bands to alternately grip and release the drum.

3. Starting mechanism comprising a disk, a drum having a central hole which receives the disk, connections between the disk and the drum, rockers having bearing blocks engaging the periphery of the drum, springs against which the bearing blocks rest, means for adjusting the tension of the springs, gripping bands which inclose the drum and are attached to the rockers at unequal distances from the bearing points and means for actuating the rockers to cause the bands to alternately grip and release the drum.

4. Starting mechanism comprising a disk, a drum having a central hole which receives the disk, connections between the disk and the drum, rockers bearing upon the periphery of the drum and provided with sockets at unequal distances from the bearing points, gripping bands which inclose the drum and are provided at their ends with means for rigidly engaging the sockets and means for actuating the rockers to cause the bands to alternately grip and release the drum.

5. Starting mechanism comprising a drum, three-armed rockers bearing upon the periphery of the drum, gripping bands which inclose the drum and are attached to said arms at unequal distances from the bearing points and operating connections engaging the third arms of said rockers.

6. Starting mechanism comprising a drum, a casing inclosing said drum and having slots in its periphery, rockers bearing on the periphery of the drum and having arms extending through the slots, gripping bands which inclose the drum and are attached to the rockers within the casing and at unequal distances from the bearing points and operating connections engaging the rockers outside the casing.

7. Starting mechanism comprising a drum, a casing inclosing said drum and having slots in its periphery, rockers bearing on the periphery of the drum and having arms extending through the slots, gripping bands which inclose the drum and are attached to the rockers within the casing and at unequal distances from the bearing points and curved slides corresponding with the casing which are pivoted to the rockers and cover the slots.

8. Starting mechanism comprising a drum, a casing inclosing said drum and having slots in its periphery, gripping bands inclosing the drum, rockers bearing on opposite sides of the periphery of the drum and having arms extending through the slots, means for attaching the ends of the bands to the respective rockers at unequal distances from the bearing points, operating connections engaging the rockers outside the casing and means for adjusting the position of the casing to secure alinement of the bands, rockers and operating connections.

In testimony whereof I affix my signature in presence of two witnesses.

HUBERT MEREDITH-JONES.

Witnesses:
 FRED. KALMBACH,
 ALBERT KALMBACH.

Copies of this patent may be obtained for five cents each, by addressing the "Commissioner of Patents, Washington, D. C."